United States Patent
Yu et al.

(10) Patent No.: US 11,408,177 B2
(45) Date of Patent: Aug. 9, 2022

(54) ROOFING MEMBRANES WITH IMPROVED ADHESIVE BONDING STRENGTH

(71) Applicant: BMIC LLC, Dallas, TX (US)

(72) Inventors: Lingtao Yu, Summit, NJ (US); Linlin Xing, Wayne, NJ (US); Daniel E. Boss, Morris Township, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 16/571,710

(22) Filed: Sep. 16, 2019

(65) Prior Publication Data

US 2020/0095768 A1 Mar. 26, 2020

Related U.S. Application Data

(60) Provisional application No. 62/837,279, filed on Apr. 23, 2019, provisional application No. 62/735,392, filed on Sep. 24, 2018.

(51) Int. Cl.
*E04D 5/10* (2006.01)
*B32B 27/32* (2006.01)
(Continued)

(52) U.S. Cl.
CPC .............. *E04D 5/10* (2013.01); *B32B 27/08* (2013.01); *B32B 27/32* (2013.01); *E04D 5/148* (2013.01);
(Continued)

(58) Field of Classification Search
CPC .. E04D 5/10; E04D 5/06; E04D 5/148; B32B 27/08; B32B 27/32; B32B 27/308;
(Continued)

(56) References Cited

U.S. PATENT DOCUMENTS

| 5,468,560 A | * | 11/1995 | McPherson | .............. C08J 7/123 |
| | | | | 428/412 |
| 5,879,757 A | | 3/1999 | Gutowski et al. | |

(Continued)

OTHER PUBLICATIONS

Yim, J.H.J., "Tailoring Interfacial Performances of UHMW PE Fiber Composites via Covalent Bonding Assisted by Plasma Surface Treatments", Drexel University, Ph.D. Dissertation (Jun. 2011), 203 pages (Year: 2011).*

(Continued)

*Primary Examiner* — Scott R. Walshon
(74) *Attorney, Agent, or Firm* — Greenberg Traurig, LLP

(57) ABSTRACT

Systems and methods are described herein for manufacturing and using roofing membranes that are faster and easier to install than conventional adhesive-only membrane materials. In some embodiments, membrane materials are surface treated using a plasma flow, e.g., a blown-arc plasma flow, atmospheric plasma, corona plasma, or from portable plasma units, generated by passing a compressed plasma-generating gas through an electrical current to form the plasma-treated roofing membrane. The plasma treatments described herein may be applied as part of the manufacturing process, or in-situ at the site of roof installation. In some embodiments, membrane materials have surface chemistries, roughnesses and other surface characteristics that yield desired adhesion properties.

21 Claims, 4 Drawing Sheets

(51) Int. Cl.
*E04D 5/14* (2006.01)
*B32B 27/08* (2006.01)

(52) U.S. Cl.
CPC ....... *B32B 2310/14* (2013.01); *B32B 2419/06* (2013.01)

(58) Field of Classification Search
CPC ... B32B 27/306; B32B 13/10; B32B 2419/06; B32B 2310/14; B32B 21/14
See application file for complete search history.

(56) References Cited

U.S. PATENT DOCUMENTS

| | | | |
|---|---|---|---|
| 6,305,143 B1 * | 10/2001 | Streets | C08G 18/10 52/746.11 |
| 6,579,924 B2 | 6/2003 | Georgeau et al. | |
| 7,211,616 B2 | 5/2007 | Kaszubski et al. | |
| 7,317,051 B2 | 1/2008 | Georgeau et al. | |
| 7,459,185 B2 | 12/2008 | Gutowski et al. | |
| 7,641,952 B2 | 1/2010 | ORourke et al. | |
| 7,767,308 B2 | 8/2010 | Georgeau et al. | |
| 7,772,301 B2 | 8/2010 | Fensel et al. | |
| 7,781,513 B2 | 8/2010 | Lucas et al. | |
| 8,138,297 B2 | 3/2012 | Huang et al. | |
| 8,153,261 B2 | 4/2012 | Landon et al. | |
| 8,450,411 B2 | 5/2013 | Zander et al. | |
| 8,481,668 B2 | 7/2013 | Gauthier et al. | |
| 8,590,224 B2 | 11/2013 | Rummens | |
| 8,592,517 B2 | 11/2013 | Zander et al. | |
| 8,702,892 B2 | 4/2014 | Arber et al. | |
| 8,709,351 B2 | 4/2014 | Hammen et al. | |
| 8,791,185 B2 | 7/2014 | Walther et al. | |
| 8,865,817 B2 | 10/2014 | Futscher et al. | |
| 8,974,627 B2 | 3/2015 | Schubert et al. | |
| 9,156,981 B2 | 10/2015 | Lim et al. | |
| 9,309,437 B2 | 4/2016 | Stanjek et al. | |
| 9,409,382 B2 | 8/2016 | Hakansson et al. | |
| 9,493,689 B2 | 11/2016 | Stanjek et al. | |
| 9,534,158 B2 | 1/2017 | Fujimoto et al. | |
| 9,790,315 B2 | 10/2017 | Kramer et al. | |
| 9,850,411 B2 | 12/2017 | Goubard | |
| 2003/0087982 A1 * | 5/2003 | Kanazawa | C08J 7/0427 522/49 |
| 2003/0129323 A1 | 7/2003 | Dornieden et al. | |
| 2003/0185965 A1 | 10/2003 | Lin et al. | |
| 2007/0166479 A1 | 7/2007 | Drake et al. | |
| 2009/0065967 A1 * | 3/2009 | Clune | A44B 18/0049 264/167 |
| 2009/0130314 A1 * | 5/2009 | Bauman | B05D 3/101 427/297 |
| 2009/0137711 A1 * | 5/2009 | Georgeau | C08K 5/0008 524/270 |
| 2010/0173116 A1 | 7/2010 | Bainbridge | |
| 2011/0159300 A1 | 6/2011 | Rokowski et al. | |
| 2012/0055105 A1 | 3/2012 | Kohl et al. | |
| 2012/0107626 A1 | 5/2012 | Schindler et al. | |
| 2012/0227793 A1 | 9/2012 | Meier et al. | |
| 2013/0299074 A1 | 11/2013 | Chartrel et al. | |
| 2014/0037882 A1 * | 2/2014 | Georgeau | B32B 5/028 428/41.8 |
| 2014/0261965 A1 | 9/2014 | Tang et al. | |
| 2015/0114552 A1 | 4/2015 | Cernohous et al. | |
| 2016/0236402 A1 * | 8/2016 | Nakashima | B32B 7/025 |
| 2016/0312471 A1 | 10/2016 | Hubbard et al. | |
| 2016/0362893 A1 | 12/2016 | Tang et al. | |
| 2017/0058510 A1 | 3/2017 | Seabaugh et al. | |
| 2017/0240689 A1 | 8/2017 | Kramer et al. | |
| 2017/0298630 A1 | 10/2017 | Hubbard | |
| 2017/0306628 A1 | 10/2017 | Simonis et al. | |
| 2019/0344543 A1 | 11/2019 | Seth | |
| 2020/0095478 A1 | 3/2020 | Young et al. | |

OTHER PUBLICATIONS

Author Unknown, "Versatility Starts Here: α-Hybrids For Elastic Sealing and Bonding" Geniosil—2013.
International Search Report and Written Opinion for International application No. PCT/US2019/051265, dated Nov. 19, 2019, 8 pages.
Yim, J.H.J, "Tailoring Interfacial Performance of UHMW PE Fiber Composites via Covalent Bonding Assisted by Plasma Surface Treatments", Drexel University, Ph.D. Dissertation (Jun. 2011) 5 pages.

* cited by examiner

ROOFING MEMBRANES WITH IMPROVED ADHESIVE BONDING STRENGTH

BACKGROUND

Current systems and methods for roofing protection of commercial and residential roofing often employ an adhesive-only system that provides good protection and has a long installed life, but can be difficult to achieve strong, enduring adhesion between the membrane materials and a roof substrate. Adhesive-only systems can therefore be difficult to install, often require a fleecy layer to aid adhesion, and often require application of the adhesive to both the membrane and the roof substrate. Alternatively, membrane materials can be held in place using mechanical fasteners, which are cheaper and easier to install than the adhesive-only system, but often fail sooner due to the dispersed puncture points.

SUMMARY

In certain embodiments, the invention described herein comprises a roofing system comprising a roofing substrate and a roofing membrane. The roofing membrane comprises a surface configured to adhere to the roofing substrate, and the surface comprises a combined total of 3.5-10 mole percent of carbonyl groups and carboxyl groups as measured by X-ray photoelectron spectroscopy.

In certain embodiments, the invention described herein comprises a method comprising subjecting an application surface of a roofing membrane to a plasma; applying an adhesive material to the application surface of the roofing membrane; and contacting the application surface of the roofing membrane to a roofing substrate thereby adhering the roofing membrane to the roofing substrate; wherein the step of contacting the application surface of the roofing membrane to the roofing substrate is performed without first applying the adhesive material to the roofing substrate and wherein the surface comprises a combined total of 3.5-10 mole percent of carbonyl groups and carboxyl groups as measured by X-ray photoelectron spectroscopy.

In certain embodiments, the invention described herein comprises a roofing membrane comprising a surface for adhering to a roof substrate, wherein the surface comprises a combined total of 3.5-10 mole percent of carbonyl groups and carboxyl groups as measured by X-ray photoelectron spectroscopy.

In certain embodiments, the roofing membrane comprises at least one of thermoplastic polyolefins, polyvinyl chlorides, cyclopiazonic acid, chlorinated polyethylene resins, ethylene interpolymers, nitrile butadiene polymers, polyisobutylene, atactic-polypropylene, APP-modified bitumen, poly(styrene-butadiene-styrene), styrene ethylene butylene styrene, ethylene propylene diene monomers, chlorosulfonated polyethylene rubbers, polychloroprene, extracellular region membranes, polycarbonate, nylon, polyvinyl acetate, polystyrene, polytetrafluoroethylene, polyvinylidene fluoride, polyurethane, epoxy, or combinations thereof.

In certain embodiments, the roofing substrate comprises at least one of silicone, plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic or combinations thereof.

In certain embodiments, the roofing membrane comprises a thermoplastic polyolefin and the roofing substrate comprises a thermoplastic polyolefin.

Certain embodiments further comprise an adhesive material applied to at least one of the surface and the roofing substrate, the adhesive material comprising at least one of an epoxy adhesive, a polyurethane adhesive, an acrylic adhesive, an ultraviolet radiation cured adhesive, a silicone-containing adhesive, a silyl modified polymer, natural rubber, a polyolefin, a polyamide polyvinyl acetate, a polyvinyl alcohol, an ethylene vinyl acetate, a styrene, a styrene-isoprene-styrene, a styrene-butadiene-styrene, a polyamide, a polyester, a polyester amide, an ethylene acrylic, a butyl rubber, or combinations thereof. In certain embodiments, the adhesive material comprises 15-30 weight percent of a silyl modified polymer. In certain embodiments, the adhesive material comprises a solids volume percentage of at least about 90%.

In certain embodiments, when the roofing membrane is exposed to 70 degrees Fahrenheit for seven months, a peel strength of the roofing membrane after exposure is greater than a peel strength of the roofing system before the exposure.

In certain embodiments, an average roughness of the surface is 12-40 microns as measured using stylus profilometry.

DETAILED DESCRIPTION

Figure 1:
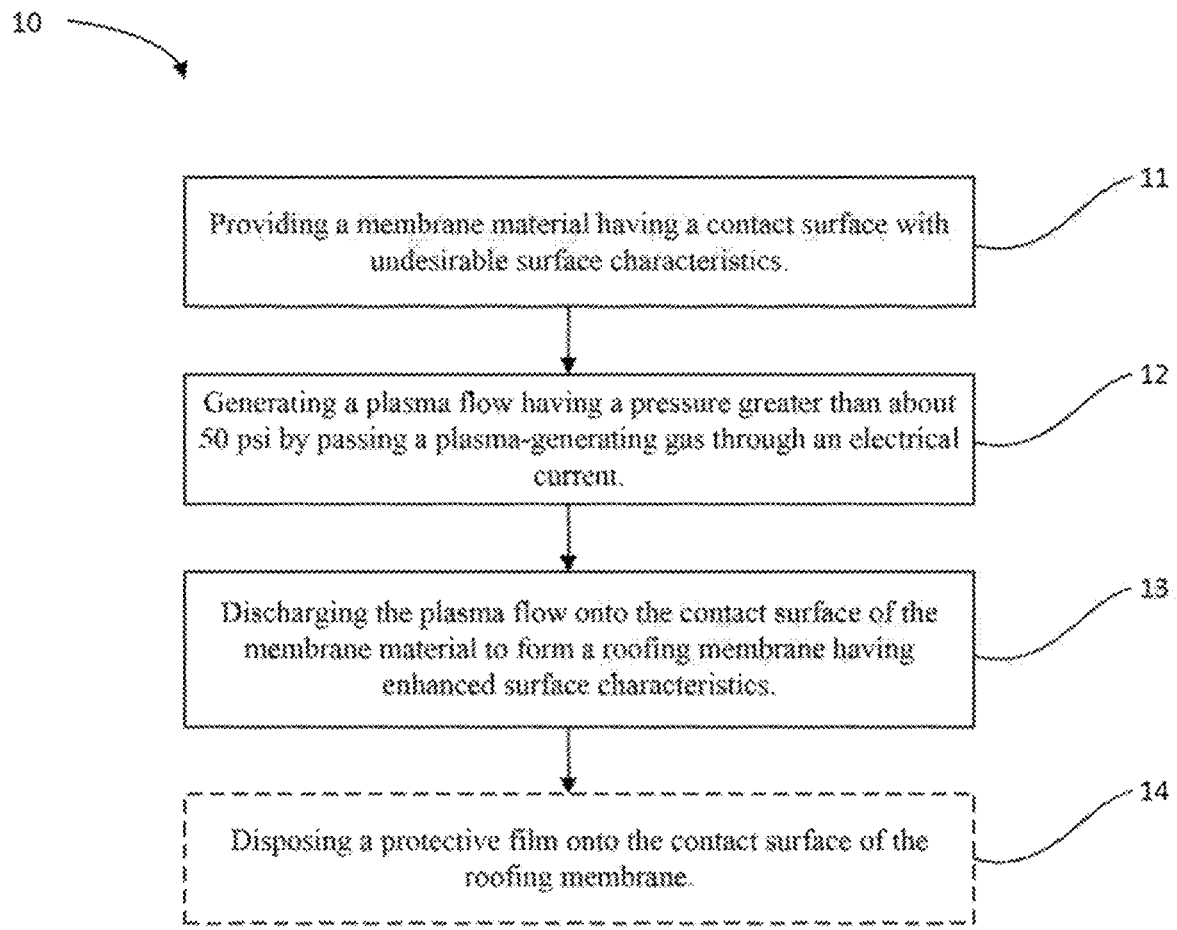
FIG. 1 is a flow chart illustrating a method for manufacturing a roofing membrane having improved adhesion characteristics when directly adhered to a roof substrate, according to an embodiment.

Systems and methods are described herein for the manufacturing and use of roofing membranes with surface characteristics that, in embodiments, make them faster and easier to install than conventional adhesive-only membrane materials, exhibit superior performance when compared to mechanically fastened membrane materials, are capable of application without the use of fleecy layers or other underlayments, and do not require the application of adhesive to both the membrane and roof substrate. In some embodiments, membrane materials are surface treated using a plasma flow generated by passing a compressed plasma-generating gas through an electrical current to form the plasma-treated roofing membrane. Plasma treatments as described herein result in surface chemistries, surface roughnesses and other surface characteristics that yield a stronger, more enduring adhesion between roofing membranes and underlying roof substrates. This increased adhesion has many positive implications when compared with conventional roofing systems, such as the ability to use adhesives and membrane materials and sizes not previously suitable for long-term roofing applications, a substantial reduction in the amount of adhesive material required to obtain the bonding required for roofing applications, the reduction or elimination in the use of mechanical fasteners, fleece or other underlayers to aid adhesion, a substantial reduction in installation time, the ability to use liquid flashing, and the ability to effectively treat pre-existing roofing materials in the field. The plasma treatments are applied at any suitable time to the roofing membranes described herein, such as part of in-line processing during membrane manufacturing, at the time of installation as an in-situ process using portable plasma units as described herein, or at any time between manufacture and installation.

Polymeric membranes are often used in conventional roofing systems to cover roofs because of the durability and relative impermeability of these materials. These membrane materials are typically stored, distributed, and transported in rolls such that the roll of membrane material is unrolled during application. Some membrane materials have been developed that are coupled to the roof substrate using an adhesive, bonding agent, crosslinking agent, epoxy, or the like. However, it can be difficult to achieve strong, enduring adhesion of these membranes, and/or a long adhesive solvent flash-off time may be required for the membrane to adhere to the roof substrate. Conventional membrane materials are typically installed by a) cleaning and drying the roof substrate, b) trimming the conventional membrane to the roof substrate geometry, c) applying a first quantity of an adhesive to the roof substrate, d) applying a second quantity of an adhesive to the contact surface of the conventional membrane, e) arranging the conventional membrane on the roof substrate, f) allowing the solvents within the adhesives to flash off over a period of between 10 and 30 minutes, and g) applying the membrane to the roof substrate such that it adheres to the roof substrate. In other words, during application of conventional membrane material, the adhesive material is typically applied to both the membrane and to the roof substrate, the solvents within the adhesive material are allowed to flash off for a period of time until both surfaces are tacky, and then the membrane is held against the roof substrate until the adhesive material can set, cure, crosslink, or otherwise adhere the membrane material to the roof substrate. The requirement for applying the adhesive to both the membrane material and the roof substrate as well as the long solvent flash-off period results in a time-consuming installation process for conventional membrane materials. In addition, working with two "sticky" surfaces can be difficult for the installer.

In addition, conventional membrane materials, such as those made from thermoplastic polyolefins (TPO) or polyvinyl chloride (PVC) for example, often require an adhesion-assisting layer coupled to the membrane material in order to achieve proper adhesion to the roof substrate. Such adhesion-assisting layers includes a fleece material (e.g., "fleece-backed membranes") a texturing layer, a solvent-treated layer, or the like. Adding adhesion-assisting layers can lead to time-consuming manufacturing, a more costly membrane product, and can add to both the weight and bulkiness of roofing systems. Conventional membrane materials can also be treated, e.g., chemically, to provide texture and/or provide a slight increase in surface energy such that the membrane will adhere to the roof substrate, however, these surface treatments often increase overall hazardous chemical use during manufacturing of the membrane and often lead to weaker and less uniform adhesion than membranes including adhesion assigning layers.

Other conventional membrane materials are mechanically fastened to the roof substrate using screws or other fasteners at discrete points across the surface of the membrane material. The process of mechanically fastening the membrane material to the roof substrate can be relatively faster than adhesive-only membrane materials, however, mechanically fastened membrane materials often degrade, tear, wear, erode, thin, separate, delaminate, or otherwise fail at one or more of the discrete fastening points during long-term use.

In other words, conventional mechanical fastening approaches are often faster and cheaper to install when compared to adhesive-only approaches, but tend to fail earlier than adhesive-only approaches. Adhesive-only approaches typically result in longer-lasting protection for the roof, but are more costly and time-consuming to install, and result in heavier and bulkier membranes. In addition, conventional solvent surface treatments typically produce more toxic chemical waste than the mechanical fastening approach. Therefore, there is a need in the market for an adhesive-only roofing membrane that is superior to mechanically fastened membranes, easier and quicker to install than conventional adhesive-only membrane materials, and that does not require an adhesion-assisting layer.

The roofing membranes according to the present disclosure are used for any commercial or residential roofing system, in any suitable form factor, and can have a stronger adhesive bond to the underlying roof substrate when compared to conventional roofing materials. The stronger bond is maintained over conventional storage times prior to installation. Such roofing membranes exhibit superior adhesive properties when compared with conventional membranes, and result in highly desirable attributes such as the ability to be applied with less adhesive materials and/or adhesive materials with high solids contents that do not require prolonged solvent flash-off periods. The roofing membranes described herein are created by subjecting membrane surfaces to a plasma, or otherwise possess surface chemistries, roughnesses and other characteristics that result in desired adherence properties. Although the inventive roofing membranes are described with specific reference to formation by plasma treatment, it should be appreciated that the inventive roofing membranes may be formed by any other suitable method provided that they possess the surface characteristics as described herein.

The plasma-treated roofing membranes described herein includes any combination of polymeric materials, plastics such as thermoplastics, synthetic rubbers, thermosetting polymers, and combinations thereof. In some embodiments, the plasma-treated roofing membrane includes thermoplastic polyolefins (TPO), polyvinyl chlorides (PVC), cyclopiazonic acid (CPA), chlorinated polyethylene resins (CPE), ethylene interpolymers (EIP), nitrile butadiene polymers (NBP), polyisobutylenes (PM), atactic-polypropylene (APP), APP-modified bitumen, poly(styrene-butadiene-styrene) (SBS), styrene ethylene butylene styrene (SEBS), ethylene propylene diene monomers (EPDM), chlorosulfonated polyethylene rubbers (CSPE), polychloroprene (CR), extracellular region membranes (ECR), polycarbonate, nylon, polyvinyl acetate, polystyrene, polytetrafluoroethylene, polyvinylidene fluoride (PVDF), polyurethane, epoxy and the like. In an embodiment, the plasma-treated roofing membrane comprises TPO. In some embodiments, plasma-treated roofing membranes are manufactured by melt-mixing and extruding to form membrane sheets having a substantially uniform thickness. In some embodiments, other materials are treated by plasma for other industries, such as geomembrane, below-grade water proofing and vapor barriers, flexible roofing for recreational vehicles, boats, trailers, and other vehicles, water retention membranes/pond liners, fracking and other mining/drilling containment liners, and flexible shelters/roofs.

Systems and methods are described herein for manufacturing plasma-treated roofing membranes that are faster and easier to install than conventional adhesive-only membrane materials, and that exhibit superior performance when compared to mechanically fastened membranes. In some embodiments, the method includes generating a plasma flow, e.g., blown-arc plasma, atmospheric plasma, blown ion plasma, or corona plasma. In some embodiments, the plasma flow is dispersed due to the pressure differential between the pressurized plasma-generating gas and atmospheric pressure just beyond the plasma flow discharge point. In other words, pressurizing the plasma-generating gas increases the flow rate of the plasma flow and/or the distance the plasma flow travels from the discharge point. The intensity of plasma treatment is therefore tuned by varying the pressure of the plasma-generating gas, the shape of a nozzle used for dispersing the plasma flow, and/or the distance of the discharge point from the membrane material. In some embodiments, the contact surface of the membrane material is plasma treated using the plasma flow such that at least one of the average surface energy and the surface concentration of carbon in the form of carbonyl groups (including carboxyl groups) increases, thereby forming the plasma-treated roofing membrane. Without wishing to be bound by any particular theory, by modifying the contact surface of the membrane material, the resulting plasma-treated roofing membrane adheres directly to the roof substrate using a conventional adhesive or any of the adhesives described herein without requiring a long solvent flash-off time and without having to apply an adhesive material to both the roof substrate and the plasma-treated roofing membrane prior to installation. In some embodiments, the strength of adhesion (measured as peel strength) increases for plasma-treated roofing membranes relative to conventional membrane materials. As used herein, "peel strength" means the load required to delaminate adhered membrane from roof substrate after room temperature (i.e., 72° F.) storage for seven days, at an angle of separation of 90°, unless otherwise specified herein. In some embodiments, the installed life of the plasma-treated roofing membrane is greater than or equal to the expected life of conventional adhesive-only membrane materials. In some embodiments, mid-term and long-term storage of the plasma-treated roofing membrane between surface treatment and installation incurs only a minor degradation in surface characteristics. In other words, the plasma-treated roofing membrane is stored for upwards of one to two years, after which time the surface energy, surface carbon concentration in the form of carbonyl groups (including carboxyl groups), peel strength, installed life, and other characteristics of the plasma-treated membrane can remain superior to those of conventional adhesive-only membrane materials. In some embodiments, the characteristics of the plasma-treated roofing membrane after one to two years of storage are superior to those of untreated membrane materials after a similar duration of storage. In some embodiments, the characteristics of the plasma-treated roofing membrane after one to two years of storage are superior to those of untreated membrane materials immediately after manufacturing. In that way, the plasma-treated roofing membranes described herein not only provide superior performance based on experimental results and lab tests, but also retain the unique surface characteristics and superior performance through the time and conditions of conventional distribution systems.

The inventors have found that the plasma treatment of roofing membranes results in an increase in the surface concentration of carbonyl groups and carboxyl groups. Carbonyl groups are functional groups composed of a carbon atom double-bonded to an oxygen atom. Carboxyl groups are a subset of carbonyl groups consisting of a carbon atom double bonded to an oxygen atom and single bonded to a hydroxyl group. Using X-ray photoelectron spectroscopy (XPS) techniques, the inventors have determined that a surface concentration of total carbonyl groups and carboxyl groups on plasma-treated roofing membranes of at least 3.5 mol % in some embodiments, 3.5-8 mol % in other embodiments, 4-8 mol % in other embodiments, 4.5-8 mol % in other embodiments, 5-8 mol % in yet other embodiments, 5.5-8 mol % in yet other embodiments, 6-8 mol % in yet other embodiments, 6.5-8 mol % in yet other embodiments, 7-8 mol % in yet other embodiments, and 7.5-8 mol % in yet other embodiments, results in desirable long-term adhesion of roofing membranes. As a non-limiting example, the inventors have found that the atmospheric plasma treatment of TPO roofing membranes resulted in a total increase of carbonyl groups and carboxyl groups from about 2.3 mol % to about 6.4 mol %, decreasing to 5.2 mol % over 14 months. As another non-limiting example, the inventors have found that the blown arc plasma treatment of TPO roofing membranes resulted in a total increase of carbonyl groups and carboxyl groups from about 2.3 mol % to about 6.9 mol %, decreasing over to 4.9 mol % over 14 months. Without wishing to be bound by theory, the inventors believe that the relatively high amount of surface carbon and/or oxygen in the form of carbonyl groups and carboxyl groups is a factor that contributes to the enhanced adhesive properties described herein. This premise is illustrated by a comparison of non-limiting example inventive embodiments to comparative examples, as shown in Table I. The adhesion performance for each of the examples listed in Table I was tested by brushing 2 inch-by-6 inch coupons of each sample with silyl terminated polyether based adhesive to a thickness of 10-15 mils, applying each to a polyisocyanurate substrate, allowing each to dry in atmospheric conditions for an average of 7 days, and then pulling the sample from the substrate to observe the failure mode.

TABLE I

Comparison of surface chemistry, surface energy, and bonding strength to thermoplastic
olefin substrate using a silyl terminated polyether based adhesive

| Sample | Surface amount (combined total) carbonyl and carboxyl groups (mol %) | Peel strength (pounds per linear inch—PLI) | Surface energy (dyne/cm) | Adhesion performance |
|---|---|---|---|---|
| Comparative TPO example 1 | 1.8 | 0.1 | 31 | Low adhesion (adhesive failure) |
| Comparative TPO example 2 | 3.4 | 0.1 | 42 | Low adhesion (adhesive failure) |
| Comparative TPO example 3 | 2.5 | 0.1 | 37 | Low adhesion (adhesive failure) |
| Comparative TPO example 4 | 2.3 | 0.1 | 23 | Low adhesion (adhesive failure) |
| Inventive blown arc plasma treated TPO | 6.9 | 3.6 | 65 | High adhesion (cohesive failure) |
| Inventive blown arc plasma treated TPO (oven aged) | 4.9 | Not tested | 63 | High adhesion (cohesive failure) |
| Inventive atmospheric plasma treated TPO | 6.4 | 4.3 | 56 | High adhesion (cohesive failure) |
| Inventive atmospheric plasma treated TPO (aged 4 months) | 5.9 | 3.3 | 41 | High adhesion (cohesive failure) |
| Inventive atmospheric plasma treated TPO (aged 18 months) | 3.8 | 4.2 | 42 | High adhesion (cohesive failure) |
| Inventive corona plasma treated TPO (aged 0.5 months) | 4.8 | 3.3 | 60 | High adhesion (cohesive failure) |
| Inventive corona plasma treated TPO (aged 18 months) | 4.4 | 2.5 | 36 | High adhesion (cohesive failure) |

It should be noted with respect to the examples shown in Table I that the thermoplastic olefin ("TPO") material of each of the inventive plasma-treated samples was the same material as untreated comparative example 4. As used herein, "adhesive failure" means failure that occurs at the adhesive interface with the substrate (e.g., TPO). As used herein, "cohesive failure" means failure that occurs within the adhesive material.

In addition to changing the surface chemistry of treated roofing membranes, the plasma treatments described in certain embodiments herein increase the surface roughness of such roofing membranes. In certain embodiments, the surface roughness is increased by at least 3×. In other embodiments, the surface roughness is increased by at least 4×. In other embodiments, the surface roughness is increased by at least 5×. In still other embodiments, the surface roughness is increased by at least 6×. In certain embodiments, the surface roughness of the roofing membranes after plasma treatment is 12-40 microns as measured using stylus profilometry. In one example, the surface roughness of comparative example 4 shown in Table I was increased from 6.8 microns to 29.5 microns by subjecting it to an atmospheric plasma treatment as described herein.

FIG. 1 illustrates a method 10 of manufacturing a plasma-treated roofing membrane that has improved adhesion characteristics when directly adhered to a roof substrate. The method 10 includes providing a membrane material having a contact surface with undesirable surface characteristics, at 11. The membrane material is manufactured, caused to be manufactured, purchased, or otherwise provided for subsequent treatment prior to installation. The membrane material is manufactured by melt-mixing and extruding to form membrane sheets having a substantially uniform thickness. The membrane material is single-ply, two-ply, or more. The total thickness of the membrane material is 0.1-100 mil (1 mil=$\frac{1}{1,000}$ inch), 0.5-100 mil, 1-100 mil, 5-100 mil, 10-100 mil, 20-100 mil, 25-100 mil, 30-100 mil, 35-100 mil, 40-100 mil, 45-100 mil, 50-100 mil, 55-100 mil, 60-100 mil, 65-100 mil, 70-100 mil, 75-100 mil, 80-100 mil, 85-100 mil, 90-100 mil, or 95-100 mil. In one embodiment, an atmospheric plasma treatment is applied to a membrane material of 3-100 mil.

In some embodiments, the method 10 includes generating a plasma flow, e.g., a blown-arc plasma flow, having a pressure greater than about 50 psi by passing a plasma-generating gas through an electrical current, at 12. In some other embodiments, the method 10 includes generating an in-line atmospheric plasma flow. The plasma flow is generated by exerting a sufficient amount of energy (e.g., an electromagnetic field) into the plasma-generating gas such that partial ionization of the gas occurs. The resulting plasma flow, consisting primarily of ions, free electrons, free radicals, excited state species, photons, and/or neutrals, is highly electrically conductive to the point that long-range electric and magnetic fields dominate the behavior of the matter. In some embodiments, the electromagnetic field is an electronic discharge between two electrodes, e.g., high-voltage electrodes. In some embodiments, the heavier ions exert more force against the lighter electrons, which results in electrons having a higher velocity (higher temperature) than the ions. In some embodiments, the plasma flow generated includes any of flame plasma, air plasma, corona discharge plasma, blown-ion plasma, blown-arc plasma, vacuum plasma, atmospheric plasma, atmospheric chemical plasma, atmospheric plasma, narrow-atmospheric plasma, arc discharge plasma, dielectric barrier discharge plasma, piezoelectric direct discharge plasma, micro-discharge plasma, resistive barrier discharges, spark discharge plasma, combinations thereof, and the like.

In some embodiments, a blown arc plasma-generation device is used to force the plasma-generating gas past two high-voltage electrodes, thereby positively charging ion particles and forming the plasma flow. An example of such a device is the Blown-Arc™ Series Plasma Treater (Enercon, Menomonee Falls, Wis.). In embodiments, the plasma-generating gas includes oxygen, argon, helium, carbon dioxide, nitrogen, ammonia, acetylene, other suitable ionizing elements, impurities found naturally in compressed gases, combinations thereof, and the like.

The plasma-generating gas is compressed to a pressure of greater than about 20 psi, about 25 psi, about 30 psi, about 35 psi, about 40 psi, about 45 psi, about 50 psi, about 55 psi, about 60 psi, about 65 psi, about 70 psi, about 75 psi, about 80 psi, about 85 psi, about 90 psi, about 95 psi, about 100 psi, about 105 psi, about 110 psi, about 115 psi, or about 120 psi, inclusive of all values and ranges therebetween. In some embodiments, the plasma-generating gas is compressed to a pressure of between about 20 psi and about 160 psi, about 25 psi and about 155 psi, about 30 psi and about 150 psi, about 35 psi and about 145 psi, about 40 psi and about 140 psi, about 45 psi and about 135 psi, about 50 psi and about 130 psi, about 55 psi and about 125 psi, about 60 psi and about 120 psi, about 65 psi and about 115 psi, about 70 psi and about 115 psi, about 75 psi and about 110 psi, about 80 psi and about 105 psi, about 85 psi and about 100 psi, about 90 psi and about 95 psi, about 20 psi and about 155 psi, about 20 psi and about 150 psi, about 20 psi and about 145 psi, about 20 psi and about 140 psi, about 20 psi and about 135 psi, about 20 psi and about 130 psi, about 20 psi and about 125 psi, about 20 psi and about 120 psi, about 20 psi and about 115 psi, about 20 psi and about 110 psi, about 20 psi and about 105 psi, about 20 psi and about 100 psi, about 20 psi and about 95 psi, about 20 psi and about 90 psi, about 20 psi and about 85 psi, about 20 psi and about 80 psi, about 20 psi and about 75 psi, about 20 psi and about 70 psi, about 20 psi and about 65 psi, about 20 psi and about 60 psi, about 20 psi and about 55 psi, about 20 psi and about 50 psi, about 20 psi and about 45 psi, about 20 psi and about 40 psi, about 20 psi and about 35 psi, about 20 psi and about 30 psi, about 20 psi and about 25 psi, about 25 psi and about 160 psi, about 30 psi and about 160 psi, about 35 psi and about 160 psi, about 40 psi and about 160 psi, about 45 psi and about 160 psi, about 50 psi and about 160 psi, about 55 psi and about 160 psi, about 60 psi and about 160 psi, about 65 psi and about 160 psi, about 70 psi and about 160 psi, about 75 psi and about 160 psi, about 80 psi and about 160 psi, about 85 psi and about 160 psi, about 90 psi and about 160 psi, about 95 psi and about 160 psi, about 100 psi and about 160 psi, about 105 psi and about 160 psi, about 110 psi and about 160 psi, about 115 psi and about 160 psi, about 120 psi and about 160 psi, about 125 psi and about 160 psi, about 130 psi and about 160 psi, about 135 psi and about 160 psi, about 140 psi and about 160 psi, about 145 psi and about 160 psi, about 150 psi and about 160 psi, or about 155 psi and about 160 psi, inclusive of all values and ranges therebetween.

In some embodiments, the pressure of the compressed plasma-generating gas causes an increased flow rate of the plasma-generating gas past the two high-voltage electrodes, ionizing the plasma-generating gas to form the plasma flow, and propelling the plasma flow out of the plasma-generation device via a discharge point. In some embodiments, the plasma flow is generated using a blown-arc plasma generation device, for instance, an $O_2$-blown arc plasma generator or an $N_2$-blown arc plasma generator. Without wishing to be bound by any particular theory, oxygen-based plasma treatments may form strong covalent carbon-oxygen bonds on the surface of the membrane; these carbon-oxygen bonds having a greater polarity than the carbon-hydrogen bonds present on the native substrate prior to plasma treatment.

In some embodiments, the temperature of the plasma-generating gas is between about 5° C. and about 40° C., while generated plasma flow temperatures, increased due to the increased free path length in a fixed chamber, after ionization, is between about 40° C. and about 80° C., between about 45° C. and about 75° C., between about 50° C. and about 70° C., between about 40° C. and about 70° C., or between about 45° C. and about 75° C., inclusive of all values and ranges therebetween.

In some embodiments, the plasma generation device includes two electrodes (e.g., high-voltage electrodes) and have a distal end configured to discharge the plasma flow via a nozzle. In some embodiments, the plasma generation device is configured to be coupled to a supply of the plasma-generating gas and a power supply. In some embodiments, the plasma generation device includes a user interface, a processor, a memory, an external communication port, a wireless transmitter, and/or a wireless receiver.

In some embodiments, the membrane material provided in step 11 is valorized and the performance when applied to a roof substrate is improved by treating the surface of the membrane material that will be adhered to the roof substrate. It has been found that plasma treatment, and in particular, blown-arc plasma treatment and atmospheric plasma treatment of membrane materials can lead to significant and longer-lasting increases in surface energy and/or average surface carbon concentration in form of carbonyl and carboxyl groups.

In some embodiments, the method 10 further includes discharging the plasma flow onto the contact surface of the membrane material to form a roofing membrane having enhanced surface characteristics, at 13. In some embodiments, the distal end of the plasma generation device includes an aperture, a lumen, a nozzle, or the like, configured to discharge the plasma flow during use of the plasma generation device. In some embodiments, the plasma generation device or components thereof are configured to be positioned in a fixed position during use and the membrane material is moved past the fixed distal end of the plasma generation device. In some embodiments, the membrane material is moved past the distal end of the plasma generation device at a rate such that the exposure of the membrane surface to the discharged plasma flow is sufficient to enhance the surface characteristics of the membrane material. In some embodiments, a sensor, a probe, a plurality of sensors, and/or a plurality of probes are used to determine the feed rate of the membrane material past the distal end of the plasma generating device, the thickness of the membrane, the distance of the distal end of the plasma generating device from the surface of the membrane, and/or the temperature of the plasma flow at a distance from the distal end of the plasma generating device. In some embodiments, the plasma generating device or components thereof are configured to be moved, for example across the surface of the membrane material, during use of the plasma generation device. In some embodiments, each of the plasma generation device and the membrane material is moved relative to the other during surface treatment of the membrane material.

In some embodiments, the distal end of the plasma generating device is positioned less than about 1 meter from the surface of the roofing membrane during plasma treatment, or less than about 95 cm, 90 cm, 85 cm, 80 cm, 75 cm, 70 cm, 65 cm, 60 cm, 55 cm, 50 cm, 45 cm, 40 cm, 35 cm, 30 cm, 25 cm, 20 cm, 19 cm, 18 cm, 17 cm, 16 cm, 15 cm, 14 cm, 13 cm, 12 cm, 11 cm, 10 cm, 9 cm, 8 cm, 7 cm, 6 cm, 5 cm, 4 cm, 3 cm, 2 cm, or 1 cm, inclusive of all values and ranges therebetween.

In some embodiments, the plasma discharge step 13 includes a single plasma discharging step or multiple plasma discharging steps. For instance, a first, higher-energy plasma flow is discharged onto the surface of the membrane for a first time period to clean and initially functionalize the surface of the membrane. A second, lower-energy plasma flow can then be discharged onto the surface of the membrane for a second time period to increase the surface energy. In some embodiments, the first time period is greater than the second time period. In some embodiments, the second time period is greater than the first time period. In some embodiments, the first time period is substantially the same as the second time period.

Figure 2:
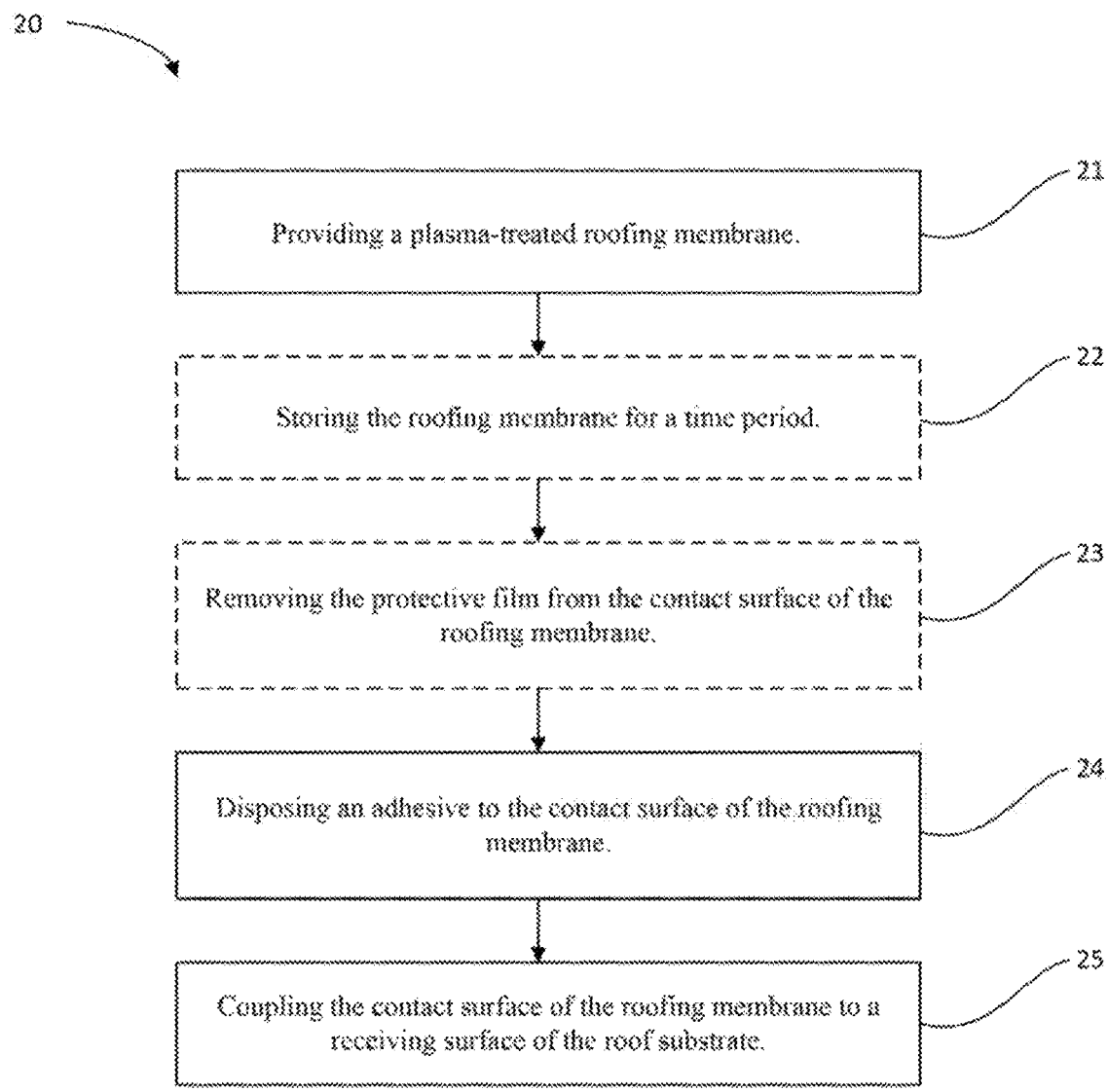
FIG. 2 is a flow chart illustrating a method for installing a roofing membrane having improved adhesion characteristics when directly adhered to a roof substrate, according to an embodiment.

FIG. 2 illustrates a method for installing a plasma-treated roofing membrane that has improved adhesion characteristics when directly adhered to a roof substrate, 20. In some embodiments, the method 20 includes providing a plasma-treated roofing membrane, at 21. In some embodiments, the plasma-treated roofing membrane is substantially similar to or the same as the plasma-treated roofing membrane manufactured according to the method 10 illustrated in FIG. 1. The plasma-treated roofing membrane can exhibit any of the surface characteristics described above with respect to FIG. 1.

In some embodiments, the method 20 can optionally include storing the plasma-treated roofing membrane for a time period, at 22. In some embodiments, the plasma-treated roofing membrane is rolled, folded, spooled, coiled, wound, or otherwise configured for mid-term or long-term storage. In some embodiments, the plasma-treated roofing membrane is stored for a period of greater than about 10 days, 20 days, 30 days, 40 days, 50 days, 60 days, 70 days, 80 days, 90 days, 100 days, 110 days, 120 days, 130 days, 140 days, 150 days, 160 days, 170 days, 180 days, 190 days, 200 days, 210 days, 220 days, 230 days, 240 days, 250 days, 260 days, 270 days, 280 days, 290 days, 300 days, 310 days, 320 days, 330 days, 340 days, 350 days, 360 days, 365 days, or longer than about 370 days, inclusive of all values and ranges therebetween. In some embodiments, the plasma-treated roofing membrane is stored for a period similar to the average, median, or maximal duration of distribution, tolled from the time of plasma treatment of the membrane material until installation of the plasma-treated roofing membrane.

In some embodiments, during the storing step 22, various environmental conditions such as temperature change, humidity change, bacteria, contaminants, and other factors can degrade the surface characteristics of the plasma-treated roofing membrane, which may also be true for conventional membrane materials. In some embodiments, the plasma-treated roofing membrane described herein is stored at about room temperature (i.e., 72° F.) without significant loss of surface characteristics imparted on the membrane surface during plasma treatment. The inventors have surprisingly found that plasma-treated membranes remain strongly adherent to roof membranes notwithstanding any reduction in surface energy over time.

In some embodiments, the method 20 includes disposing an adhesive to the contact surface of the plasma-treated roofing membrane, at 24. In some embodiments, the adhesive includes an epoxy adhesive, a polyurethane adhesive, an acrylic adhesive (e.g., acrylate, cyanoacrylate, polymethyl methacrylate (PMMA), etc.), an ultraviolet radiation cured adhesive, a silicone-containing adhesive, a silyl modified polymer (also referred to as silyl terminated polymers) such as polyether-containing or polyurethane-containing adhesives, natural rubber, a polyolefin, a polyamide polyvinyl acetate, a polyvinyl alcohol, an ethylene vinyl acetate, a styrene, a styrene-isoprene-styrene, a styrene-butadiene-styrene, a polyamide, a polyester, a polyester amide, an ethylene acrylic, a butyl rubber, combinations thereof, or the like. The ability to use different adhesives in non-limiting embodiments described herein is illustrated by a comparison of adhesion performance of untreated and treated TPO roofing membrane samples to a TPO roofing substrate, as shown in Table II. The treated TPO roofing membrane samples were subjected to a blown arc plasma, resulting in an increase in surface energy from 27.8 to 71.4 dyne/cm to. The adhesion performance of each sample listed in Table II was tested by brushing 3 inch-by-5 inch coupons of each sample with the applicable adhesive to a thickness of 20-30 mils, applying each to a TPO membrane, allowing each to dry in atmospheric conditions for an average of 7 days, and then pulling the sample from the TPO membrane to observe the failure mode.

TABLE II

Comparison of adhesion performance of untreated and treated TPO roofing membrane samples for various adhesives

| Adhesive material | Adhesion performance for untreated sample | Adhesion performance for plasma treated sample |
|---|---|---|
| Acrylic coating | Low adhesion (adhesive failure) | High adhesion (cohesive failure) |
| PVDF | Low adhesion (adhesive failure) | High adhesion (cohesive failure) |
| Silicone coating | Low adhesion (adhesive failure) | High adhesion (cohesive failure) |
| Silyl terminated polyether | Low adhesion (adhesive failure) | High adhesion (cohesive failure) |

In some embodiments, the silyl modified polyether-containing adhesive material includes between about 5 wt % to about 60 wt % of silyl modified polyether polymers, or between about 10 wt % and about 45 wt %, about 15 wt % and about 40 wt %, about 20 wt % and about 35 wt %, about 25 wt % and about 30 wt %, about 20 wt % and about 30 wt %, about 10 wt % and about 50 wt %, about 15 wt % and about 50 wt %, about 20 wt % and about 50 wt %, about 25 wt % and about 50 wt %, about 30 wt % and about 50 wt %, about 35 wt % and about 50 wt %, about 35 wt % and about 50 wt %, about 40 wt % and about 50 wt %, about 45 wt % and about 50 wt %, about 5 wt % and about 45 wt %, about 5 wt % and about 40 wt %, about 5 wt % and about 35 wt %, about 5 wt % and about 30 wt %, about 5 wt % and about 25 wt %, about 5 wt % and about 20 wt %, about 5 wt % and about 15 wt %, or about 5 wt % and about 10 wt %, inclusive of all values and ranges therebetween. In some embodiments, the silyl modified polyether-containing adhesive material includes greater than about 5 wt % of silyl modified polyether polymers, or greater than about 10 wt %, about 15 wt %, about 20 wt %, about 25 wt %, about 30 wt %, about 35 wt %, about 40 wt %, about 45 wt %, about 50 wt %, about 55 wt %, or about 60 wt %, inclusive of all values and ranges therebetween. In some embodiments, the silyl modified polyether-containing adhesive material includes less than about 60 wt % of silyl modified polyether polymers, or less than about 55 wt %, about 50 wt %, about 45 wt %, about 40 wt %, about 35 wt %, about 30 wt %, about 25 wt %, about 20 wt %, about 15 wt %, about 10 wt %, or about 5 wt %, inclusive of all values and ranges therebetween.

In an embodiment, the silyl modified polyether-containing adhesive material comprises 15-30 wt % of silyl modified polyether polymers. Such adhesive materials may not adequately bond conventional roofing membranes to underlying roof substrates, and may therefore be unsuitable for use with such membranes. Because of the improved surface properties of the plasma-treated membranes, however, such adhesive materials may be used to yield a strong, enduring bond between such membranes and underlying roof substrates. In addition, because these and other adhesive materials may be characterized by a high solids content (e.g., over 90 wt %, over 95 wt %, over 97 wt %, etc.), the quantity of adhesive required for a roofing application is significantly reduced when compared with conventional systems. For example, the adhesive materials may be effectively applied only to the roofing membrane (and not to the roof substrate, as required in conventional roofing applications) in a single layer to cover more than 150 ft$^2$/gallon in certain embodiments, more than 200 ft$^2$/gallon in other embodiments, more than 250 ft$^2$/gallon in other embodiments, and more than 300 ft$^2$/gallon of roofing area in yet other embodiments. This represents up to a five-fold or more reduction in the quantity of adhesive required for an effective roofing installation.

In some embodiments, the method 20 includes coupling the contact surface of the plasma-treated roofing membrane to a receiving surface of the roof substrate, at 25. In some embodiments, the roof substrate includes any suitable roofing material, including but not limited to plywood, cement, concrete, asphaltic shingles, compressed fiberboard, DensDeck™, Securock™, OSB board, concrete masonry units (CMU), masonry blocks, bricks, RESISTA™, ISOGARD™ HD, metal (e.g. steel, aluminum, copper, etc.), minerals, limestone, combinations thereof, and the like. Alternatively, the roof substrate includes single ply roofing including materials such as thermoplastic polyolefin (TPO) and polyvinyl chloride (PVC); and roofing coatings such as silicone, polyvinylidene fluoride (PVDF), polymethyl methacrylate (PMMA) and acrylics.

While the method 20 is shown in FIG. 2 to include a step of disposing an adhesive to the contact surface of the plasma-treated roofing membrane, at 24, the method 20 can instead include a step of disposing the adhesive to a receiving surface of the roof substrate, at 24. In other words, some embodiments of the method 20 include applying the adhesive material to the plasma-treated roofing membrane, at 24, and then disposing the plasma-treated roofing membrane onto the roof substrate such that the contact surface of the plasma-treated roofing membrane adheres to the receiving surface of the roof substrate, at 25. In some alternative embodiments of the method 20, the adhesive material is applied to the receiving surface of the roof substrate, at 24, and then the plasma-treated roofing membrane is disposed onto the roof substrate such that the contact surface of the plasma-treated roofing membrane adheres to the receiving surface of the roof substrate, at 25.

Some advantages of the plasma-treated roofing membranes described herein include that no adhesion-assisting layer, such as a fleece layer, need be coupled to the contact surface of the plasma-treated roofing membrane to aid in adhesion to the roof substrate. In other words, the plasma-treated roofing membranes described herein, also called "single-ply membranes" or "slick-back membranes" are adhered to the roof substrate using conventional adhesives and/or the silyl modified polyether-containing adhesives and adhesive mixtures, as described herein. Another advantage of the plasma-treated roofing membranes described herein is that the adhesive only has to be disposed on one of the contact surface of the plasma-treated roofing membrane and the receiving surface of the roof substrate, which makes installation faster and easier. In some embodiments, the plasma-treated roofing membranes described herein are fully installed in less than half the time required to in which a non-plasma-treated membrane materials are installed.

In some embodiments, the plasma-treated roofing membrane manufactured according to the method 10 is unrolled and installed during a time of less than about 20 minutes, 19 minutes, 18 minutes, 17 minutes, 16 minutes, 15 minutes, 14 minutes, 13 minutes, 12 minutes, 11 minutes, 10 minutes, 9 minutes, 8 minutes, 7 minutes, 6 minutes, 5 minutes, 4 minutes, 3 minutes, 2 minutes, or 1 minute, inclusive of all values and ranges therebetween. In some embodiments, the plasma-treated roofing membrane manufactured according to the method 10 can remain adhered to the roof substrate without failing cohesively or adhesively in the short-term. At an ambient installation temperature of about 24° C., the plasma-treated roofing membrane manufactured according to the method 10 is preliminarily cured (having sufficient "green strength") after less than about 4 hours, about 3.5 hours, about 3 hours, about 2.5 hours, about 2 hours, about 1.5 hours, or about 1 hour, inclusive of all values and ranges therebetween.

In some embodiments, the plasma-treated roofing membrane manufactured according to the method 10 is adhered to the roof substrate more securely than conventional membrane materials. For example, the plasma-treated roofing membrane (without any adherence layer such as a fleeceback liner) may exhibit a peel strength on a polyisocyanurate substrate using a silyl terminated polyether adhesive of greater than about 2.5 pounds per linear inch (PLI), 2.75 PLI, 3 PLI, 3.25 PLI, 3.3 PLI, 3.5 PLI, 3.6 PLI, 3.75 PLI, 4 PLI, 4.2 PLI, 4.25 PLI, 4.3 PLI, 4.5 PLI, 4.75 PLI, 5 PLI, 5.25 PLI, 5.5 PLI, 5.75 PLI, 6 PLI, 6.25 PLI, 6.5 PLI, 6.75 PLI, 7 PLI, 7.25 PLI, 7.5 PLI, 7.75 PLI, 8 PLI, 8.25 PLI, 8.5 PLI, 8.75 PLI, 9 PLI, 9.25 PLI, 9.5 PLI, 9.75 PLI, 10 PLI, 10.25 PLI, 10.5 PLI, 10.75 PLI, 11 PLI, 11.25 PLI, 11.5 PLI, 11.75 PLI, 12 PLI, 12.25 PLI or 12.5 PLI, inclusive of all values and ranges therebetween. In some embodiments, the plasma-treated roofing membrane may exhibit a peel strength of between about 2.5 PLI and about 12.5 PLI, about 5 PLI and about 10 PLI, about 7.5 PLI and about 12.5 PLI, about 2.5 PLI and about 7.5 PLI, or about 7.5 PLI and about 10 PLI, inclusive of all values and ranges therebetween. The increase in peel strength in embodiments described herein is illustrated by a comparison of the peel strength of untreated and treated TPO roofing membrane samples adhered to TPO roofing substrate using a silyl terminated polyether adhesive, as shown in Table III.

TABLE III

Comparison of peel strength and adhesion performance of untreated and treated TPO roofing membrane samples to polyisocyanurate roofing substrate using silyl terminated polyether adhesive

| Sample | Peel Strength (PLI) | Adhesion performance |
| --- | --- | --- |
| Untreated TPO | 0.1 | Low adhesion (adhesive failure) |
| Corona plasma treated TPO | 2.5 | High adhesion (cohesive failure) |

TABLE III-continued

Comparison of peel strength and adhesion performance of untreated and treated TPO roofing membrane samples to polyisocyanurate roofing substrate using silyl terminated polyether adhesive

| Sample | Peel Strength (PLI) | Adhesion performance |
| --- | --- | --- |
| Blown arc plasma treated TPO | 4.0 | High adhesion (cohesive failure) |
| Atmospheric treated TPO | 4.2 | High adhesion (cohesive failure) |

The peel strength data provided in Table III represents the highest recorded value of force required to separate the sample from the substrate, wherein each sample was 2×20 inches in size, the center 6 inches of each sample was adhered to the roofing substrate, and the free ends of each sample were moved in a direction perpendicular to the substrate at a rate of 2 in/min. In embodiments, the plasma treatments to roofing membranes as described herein results in an increase in peel strength, when adhered using substantially similar adhesives and substrate materials, of 1.1-50×; in other embodiments, peel strength is increased by 1.1-45×; in other embodiments, peel strength is increased by 1.1-43×; in other embodiments, peel strength is increased by 1.1-42×; in other embodiments, peel strength is increased by 1.1-40×; in other embodiments, peel strength is increased by 1.1-36×; in other embodiments, peel strength is increased by 1.1-35×; in other embodiments, peel strength is increased by 1.1-33×; in other embodiments, peel strength is increased by 1.1-30×; in other embodiments, peel strength is increased by 1.1-25×; in other embodiments, peel strength is increased by 1.1-20×; in other embodiments, peel strength is increased by 1.1-15×; in other embodiments, peel strength is increased by 1.1-10×; in other embodiments, peel strength is increased by 1.1-5×; in other embodiments, peel strength is increased by 1.1-4×; in other embodiments, peel strength is increased by 1.1-3×; in other embodiments, peel strength is increased by 1.1-2×; and in other embodiments, peel strength is increased by 1.1-1.5×.

In some embodiments, the plasma-treated roofing membrane manufactured according to the method 10 can remain adhered to the roof substrate for equal to or more than the desired time before adhesive failure (i.e., failure at adhesive interface), cohesive failure (i.e., failure within adhesive) or another failure mechanism occurs. For example, the life span of the installed plasma-treated membrane is greater than about 1 year, 2 years, 3 years, 4 years, 5 years, 6 years, 7 years, 8 years, 9 years, 10 years, 11 years, 12 years, 13 years, 14 years, 15 years, 16 years, 17 years, 18 years, 19 years, 20 years, 21 years, 22 years, 23 years, 24 years, 25 years, 26 years, 27 years, 28 years, 29 years, 30 years, 31 years, 32 years, 33 years, 34 years, 35 years, 36 years, 37 years, 38 years, 39 years, 40 years, 41 years, 42 years, 43 years, 44 years, 45 years, 46 years, 47 years, 48 years, 49 years, or 50 years, inclusive of all values and ranges therebetween.

Figure 3:
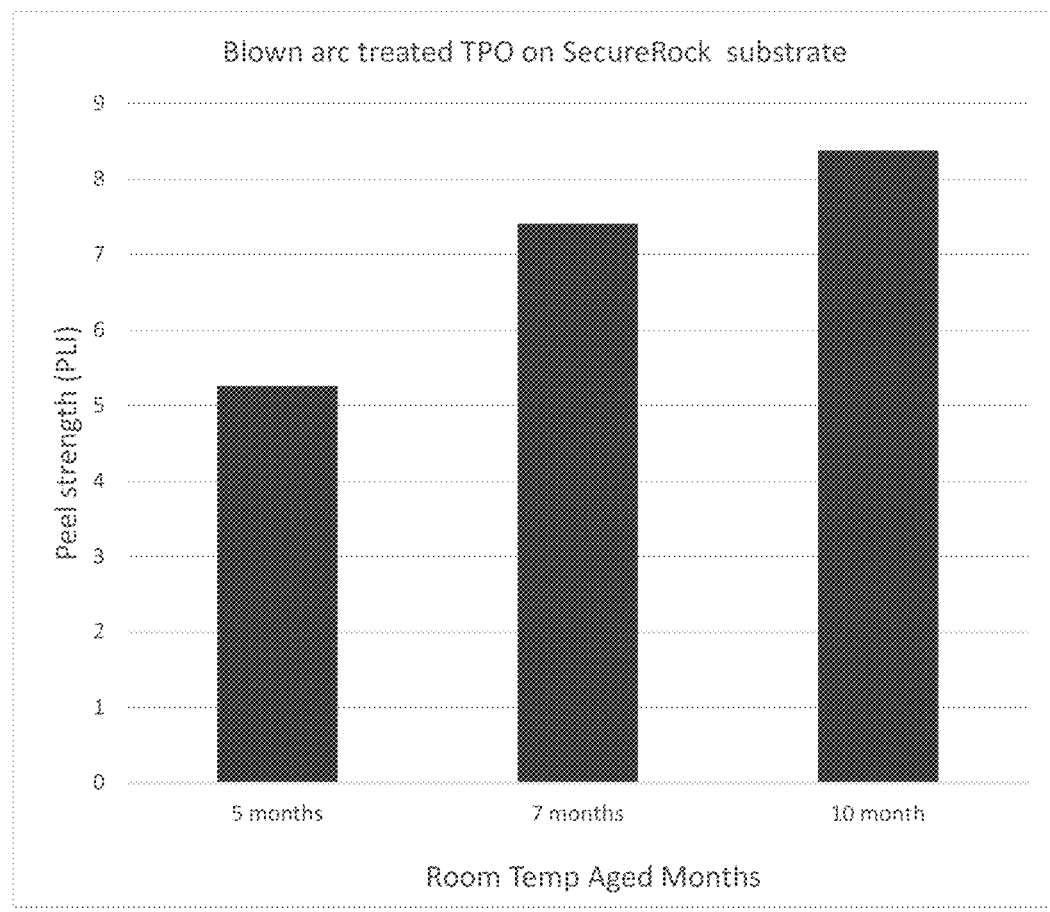
FIG. 3 is a graph illustrating the peel strength of an installed blown-arc plasma-treated single-ply TPO roofing membrane adhered to a gypsum-based roof substrate at various times after installation, according to an embodiment.
Figure 4:
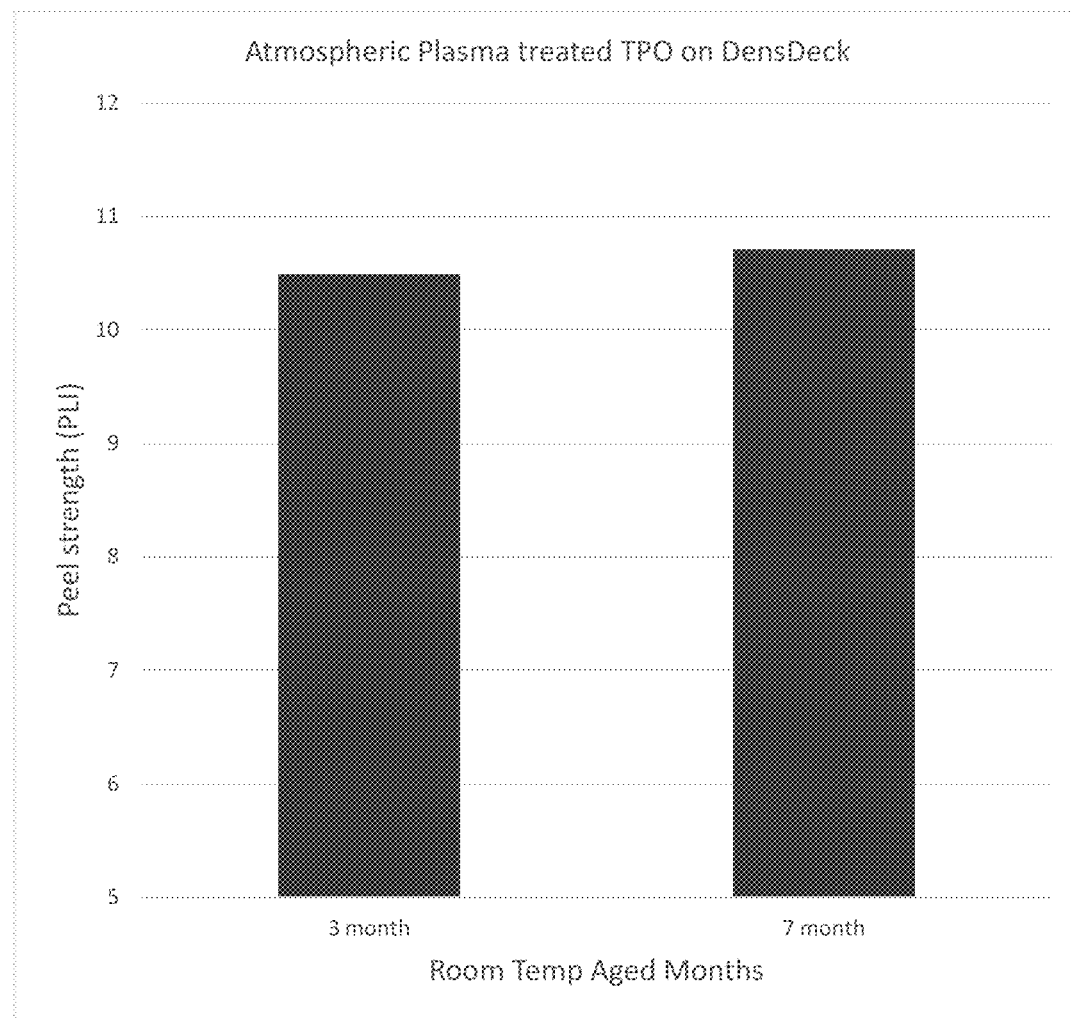
FIG. 4 is a graph illustrating the peel strength of an installed atmospheric plasma-treated single-ply TPO roofing membrane adhered to a fiberglass roof board with a gypsum core at various times after installation, according to an embodiment.

FIGS. 3 and 4 are graphs of peel strength (in PLI) of plasma-treated TPO membranes adhered to a SecureRock substrate and a DensDeck substrate and stored at room temperature (i.e., 72° F.) for either 3 months, 5 months, 7 months, or 10 months. As shown in FIG. 3, the peel strength of a blown arc plasma-treated TPO membrane adhered to a SecureRock substrate is about 5.25 PLI, about 7.5 PLI, and about 8.5 PLI at 5, 7, and 10 months, respectively. As shown in FIG. 4, the peel strength of a atmospheric plasma-treated TPO membrane adhered to a DensDeck substrate is about 10.5 PLI and about 10.75 PLI at 3 and 7 months, respectively. These experimental results illustrate that not only do the plasma treatments described herein improve adhesion of the roofing membrane to the roof substrate, but also that adhesion may increase over at least a portion of the life span of the installed membrane.

The use of the plasma-treated membranes enables a broad range of roofing applications in addition to those encountered in residential and commercial buildings and structures, including, for example, roofing and other surfaces in applications such as recreational vehicles, automobiles, boats and other marine vessels and structures, and tents and other temporary and permanent outdoor structures.

The roofing membranes described herein may be plasma treated during or after manufacturing. For example, the plasma treatment may be applied to membranes as part of the manufacturing process before they are rolled for storage and shipment. Such in-line manufacturing will allow for the plasma treatment of at least one side of membranes that are 5-12 feet in width in a manufacturing line running at a speed of up to 80 ft/min or higher. In one embodiment, an in-line plasma system uses a gas mixture comprising about 90% argon, 7% oxygen and 3% acetylene. In another embodiment, an in-line atmospheric plasma treatment is applied to one side of a membrane that is 12 feet in width in a manufacturing line running at 80 ft/min using a gas mixture of argon, oxygen and acetylene and a power of 60 watts/ft/min.

In certain embodiments, the invention described herein comprises a roofing membrane comprising a surface for adhering to a roof substrate, wherein the surface comprises a combined total of 3.5-10 mole percent of carbonyl groups and carboxyl groups as measured by X-ray photoelectron spectroscopy. In certain embodiments, the roofing membrane comprises at least one of thermoplastic polyolefins, polyvinyl chlorides, cyclopiazonic acid, chlorinated polyethylene resins, ethylene interpolymers, nitrile butadiene polymers, polyisobutylene, atactic-polypropylene, APP-modified bitumen, poly(styrene-butadiene-styrene), styrene ethylene butylene styrene, ethylene propylene diene monomers, chlorosulfonated polyethylene rubbers, polychloroprene, extracellular region membranes, polycarbonate, nylon, polyvinyl acetate, polystyrene, polytetrafluoroethylene, polyvinylidene fluoride, polyurethane, epoxy, or combinations thereof. In certain embodiments, the roofing substrate comprises at least one of silicone, plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic or combinations thereof. In certain embodiments, the roofing membrane comprises a thermoplastic polyolefin and the roofing substrate comprises a thermoplastic polyolefin. Certain embodiments further comprise an adhesive material applied to at least one of the surface and the roofing substrate, the adhesive material comprising at least one of an epoxy adhesive, a polyurethane adhesive, an acrylic adhesive, an ultraviolet radiation cured adhesive, a silicone-containing adhesive, a silyl modified polymer, natural rubber, a polyolefin, a polyamide polyvinyl acetate, a polyvinyl alcohol, an ethylene vinyl acetate, a styrene, a styrene-isoprene-styrene, a styrene-butadiene-styrene, a polyamide, a polyester, a polyester amide, an ethylene acrylic, a butyl rubber, or combinations thereof. In certain embodiments, the adhesive material comprises 15-30 weight percent of a silyl modified polymer. In certain embodiments, the adhesive material comprises a solids volume percentage of at least about 90%. In certain embodiments, when the roofing membrane is exposed to 70 degrees Fahrenheit for seven months, a peel strength of the roofing membrane after exposure is greater than a peel strength of the roofing system before the exposure. In certain embodiments, an average roughness of the surface is 12-40 microns as measured using stylus profilometry.

The plasma treatment may be applied at the time of roof installation using a portable plasma treatment unit. Such portable plasma units are configured to be operational at environments that include outdoor roof top locations. When the plasma treatment is to be applied to the roofing membrane, the portable plasma unit is configured to apply a wide area of the membrane in a single pass. For example, a single or multiple handheld or other portable plasma guns or similar devices may be mounted side-by-side on a moveable frame comprising at least one wheel such that the unit is rolled over the membrane to apply the plasma treatment in as few passes as possible before the membrane is applied to the roof substrate. Examples of commercially available portable plasma guns include the Dyne-A-Grip IT™ (Enercon Industries Corporation, Menomonee Falls, Wis.) Hand Held Plasma Treater. In embodiments, portable plasma units are controlled using plasma gun operating output parameters including 3-4 KV voltage, 200-300 mA current, and 80-130 W power.

In embodiments, portable plasma units are used to treat existing roof membranes to facilitate repairs and reinforcements, or to apply lettering, logos, or other marks to roof tops or other structural surfaces. For example, a portable plasma unit may treat a roof substrate that is otherwise characterized by low adherence properties in order to apply liquid flashing and coatings (e.g., silicone, modified silicone adhesive, acrylic, polyvinylidene fluoride (PVDF), polyurethane, epoxy, cyanoacrylate, polymethyl methacrylate (PPMA) or the like), and pressure sensitive adhesive tapes such as those that include acrylics, butyl rubber, ethylene vinyl acetate, natural rubber, nitriles, silicone rubber, styrene block copolymers (SBC), styrene-butadiene-styrene (SBS), styrene-ethylene/butylene-styrene (SEBS), styrene-ethylene/propylene (SEP), styrene-isoprene-styrene (SIS), and vinyl ethers. The portable plasma unit can also be used to treat inorganic roofing materials such as metals (e.g., steel, aluminum, copper) and minerals (e.g., cement, limestone, masonry, brick, glass) for flashing and coating.

To provide an overall understanding, certain illustrative embodiments have been described; however, it will be understood by one of ordinary skill in the art that the systems, apparatuses, and methods described herein can be adapted and modified to provide systems, apparatuses, and methods for other suitable applications and that other additions and modifications can be made without departing from the scope of the systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

As used herein, the terms "about" and "approximately" generally mean plus or minus 10% of the value stated, for example about 250 µm would include 225 µm to 275 µm, approximately 1,000 µm would include 900 µm to 1,100 µm.

Conventional terms in the fields of materials science and engineering have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The invention claimed is:

1. A roofing system comprising:
   a roofing substrate; and
   a roofing membrane;
   wherein the roofing membrane comprises a surface configured to adhere to the roofing substrate, and
   wherein the surface comprises a combined total of 3.5-10 mole percent of carbonyl groups and carboxyl groups as measured by X-ray photoelectron spectroscopy.

2. The roofing system of claim 1, wherein the roofing membrane comprises at least one of thermoplastic polyolefins, polyvinyl chlorides, cyclopiazonic acid, chlorinated polyethylene resins, ethylene interpolymers, nitrile butadiene polymers, polyisobutylene, atactic-polypropylene (APP), APP-modified bitumen, poly(styrene-butadiene-styrene), styrene ethylene butylene styrene, ethylene propylene diene monomers, chlorosulfonated polyethylene rubbers, polychloroprene, extracellular region membranes, polycarbonate, nylon, polyvinyl acetate, polystyrene, polytetrafluoroethylene, polyvinylidene fluoride, polyurethane, epoxy, or combinations thereof.

3. The roofing system of claim 1, wherein the roofing substrate comprises at least one of plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic or combinations thereof.

4. The roofing system of claim 1, wherein the roofing substrate comprises silicone.

5. The roofing system of claim 1, wherein the roofing membrane comprises a thermoplastic polyolefin and the roofing substrate comprises a thermoplastic polyolefin.

6. The roofing system of claim 1, further comprising an adhesive material applied to at least one of the surface and the roofing substrate, the adhesive material comprising at least one of an epoxy adhesive, a polyurethane adhesive, an acrylic adhesive, an ultraviolet radiation cured adhesive, a silicone-containing adhesive, a silyl modified polymer, natural rubber, a polyolefin, a polyamide polyvinyl acetate, a polyvinyl alcohol, an ethylene vinyl acetate, a styrene, a styrene-isoprene-styrene, a styrene-butadiene-styrene, a polyamide, a polyester, a polyester amide, an ethylene acrylic, a butyl rubber, or combinations thereof.

7. The roofing system of claim 1, further comprising an adhesive material applied to at least one of the surface and the roofing substrate, the adhesive material comprising 15-30 weight percent of a silyl modified polymer.

8. The roofing system of claim 7, wherein the adhesive material comprises a solids volume percentage of at least about 90%.

9. The roofing system of claim 1, wherein when the roofing membrane is exposed to 70 degrees Fahrenheit for seven months, a peel strength of the roofing membrane after exposure is greater than a peel strength of the roofing system before the exposure.

10. The roofing system of claim 1, wherein an average roughness of the surface is 12-40 microns as measured using stylus profilometry.

11. A method comprising:
    subjecting an application surface of a roofing membrane to a plasma;
    applying an adhesive material to the application surface of the roofing membrane; and
    contacting the application surface of the roofing membrane to a roofing substrate thereby adhering the roofing membrane to the roofing substrate;
    wherein the step of contacting the application surface of the roofing membrane to the roofing substrate is performed without first applying the adhesive material to the roofing substrate and
    wherein the surface comprises a combined total of 3.5-10 mole percent of carbonyl groups and carboxyl groups as measured by X-ray photoelectron spectroscopy.

12. The method of claim 11, wherein the roofing membrane comprises at least one of thermoplastic polyolefins, polyvinyl chlorides, cyclopiazonic acid, chlorinated polyethylene resins, ethylene interpolymers, nitrile butadiene polymers, polyisobutylene, atactic-polypropylene, APP-modified bitumen, poly(styrene-butadiene-styrene), styrene ethylene butylene styrene, ethylene propylene diene monomers, chlorosulfonated polyethylene rubbers, polychloroprene, extracellular region membranes, polycarbonate, nylon, polyvinyl acetate, polystyrene, polytetrafluoroethylene, polyvinylidene fluoride, polyurethane, epoxy, or combinations thereof.

13. The method of claim 11, wherein the roofing substrate comprises at least one of plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic or combinations thereof.

14. The method of claim 11, wherein the roofing substrate comprises silicone.

15. The method of claim 11, wherein the roofing membrane comprises a thermoplastic polyolefin and the roofing substrate comprises a thermoplastic polyolefin.

16. The method of claim 11, wherein the adhesive material applied to the application surface of the roofing membrane comprises at least one of an epoxy adhesive, a polyurethane adhesive, an acrylic adhesive, an ultraviolet radiation cured adhesive, a silicone-containing adhesive, a silyl modified polymer, natural rubber, a polyolefin, a polyamide polyvinyl acetate, a polyvinyl alcohol, an ethylene vinyl acetate, a styrene, a styrene-isoprene-styrene, a styrene-butadiene-styrene, a polyamide, a polyester, a polyester amide, an ethylene acrylic, a butyl rubber, or combinations thereof.

17. The method of claim 16, wherein the adhesive material applied to the application surface of the roofing membrane comprises a solids volume percentage of at least about 90%.

18. The method of claim 11, wherein the adhesive material applied to the application surface of the roofing membrane comprises 15-30 weight percent of a silyl modified polymer.

19. The method of claim 11, wherein the plasma is one of a blown-arc plasma, atmospheric plasma, blown ion plasma, or corona plasma.

20. The method of claim 11, wherein an average roughness of the application surface is 12-40 microns as measured using stylus profilometry.

21. A roofing system comprising:
a roofing substrate comprising a thermoplastic polyolefin,
a roofing membrane comprising a surface configured to adhere to the roofing substrate, and
an adhesive material applied to at least one of the surface and the roofing substrate, the adhesive material comprising a silyl modified polymer,
wherein the surface comprises a combined total of 3.5-10 mole percent of carbonyl groups and carboxyl groups as measured by X-ray photoelectron spectroscopy.

* * * * *